(12) United States Patent
Boag et al.

(10) Patent No.: US 9,292,267 B2
(45) Date of Patent: Mar. 22, 2016

(54) COMPILING NESTED RELATIONAL ALGEBRAS WITH MULTIPLE INTERMEDIATE REPRESENTATIONS

(71) Applicant: International Business Machines Corporation, Armonk, NY (US)

(72) Inventors: Scott Boag, Woburn, MA (US); Moshe M. E. Matsa, Cambridge, MA (US); Kristoffer H. Rose, Poughkeepsie, NY (US); Naoto Sato, Kawasaki (JP); Lionel A. S. Villard, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/317,314

(22) Filed: Jun. 27, 2014

(65) Prior Publication Data

US 2015/0378693 A1    Dec. 31, 2015

(51) Int. Cl.
    *G06F 9/45*    (2006.01)
(52) U.S. Cl.
    CPC ........................................ *G06F 8/41* (2013.01)
(58) Field of Classification Search
    None
    See application file for complete search history.

(56) References Cited

U.S. PATENT DOCUMENTS 6,298,342 B1 * 10/2001 Graefe et al. ................. 707/602
6,618,719 B1 *  9/2003 Andrei
(Continued)

FOREIGN PATENT DOCUMENTS

| CN | 101923472 A | 12/2010 |
| EP | 0537257 B1 | 12/1999 |
| WO | 2007061784 A2 | 5/2007 |

OTHER PUBLICATIONS

Ravindra et al., An Intermediate Algebra for Optimizing RDF Graph Pattern Matching on MapReduce, pp. 46-61, 2011.*
(Continued)

*Primary Examiner* — Isaac T Tecklu
(74) *Attorney, Agent, or Firm* — Mercedes Hobson; Hoffman Warnick LLC

(57) ABSTRACT

Aspects of the present invention provide a solution for compiling data. In an embodiment, an input query is received in a first language. The input query is translated to a nested relational algebra (NRA) in the form of a first intermediate representation (IR), wherein the first IR comprises a high-level functional language including algebraic operators. A set of algorithms of the algebraic operators is implemented to compile at least some of the first IR into a second IR, wherein the second IR comprises a data-flow language. At least one of the first IR and the second IR is compiled into a low-level code.

16 Claims, 2 Drawing Sheets

(56) References Cited

U.S. PATENT DOCUMENTS

| | | | |
|---|---|---|---|
| 8,990,827 B2* | 3/2015 | Wu et al. | 718/104 |
| 9,158,816 B2* | 10/2015 | Schindlauer | G06F 17/30929 |
| 2004/0243799 A1* | 12/2004 | Hacigumus et al. | 713/150 |
| 2007/0260578 A1* | 11/2007 | Ghosh | 707/2 |
| 2008/0082514 A1* | 4/2008 | Khorlin et al. | 707/4 |
| 2008/0256026 A1* | 10/2008 | Hays | 707/2 |
| 2009/0024622 A1* | 1/2009 | Chkodrov et al. | 707/6 |
| 2010/0114885 A1* | 5/2010 | Bowers et al. | 707/736 |
| 2011/0173184 A1* | 7/2011 | Kelshikar et al. | 707/722 |
| 2011/0289118 A1* | 11/2011 | Chen et al. | 707/803 |
| 2013/0091507 A1* | 4/2013 | Wu et al. | 718/104 |
| 2013/0138473 A1* | 5/2013 | Balko et al. | 705/7.27 |
| 2013/0139164 A1* | 5/2013 | Balko | 718/102 |

OTHER PUBLICATIONS

Bednarek, D.; "Effective Datalog-like representation of procedural programs"; Department of Software Engineering, Charles University Prague; DBLP Conference Proceedings, ITAT, pp. 9-16; 2012.

SPI DST et al.; "Compiling Customized Executable Representations and Interpreters"; An IP.com Prior Art Database Technical Disclosure; http://ip.com/IPCOM/000148098D; Mar. 28, 2007.

SPI DST et al.; "A Compiler for a Functional Programming System"; An IP.com Prior Art Database Technical Disclosure; http://ip.com/IPCOM/000150905D; Apr. 19, 2007.

SPI DST et al.; "ORBIT: An Optimizing Compiler for Scheme"; An IP.com Prior Art Database Technical Disclosure; http://ip.com/IPCOM/000128722D; Sep. 16, 2005.

* cited by examiner

COMPILING NESTED RELATIONAL ALGEBRAS WITH MULTIPLE INTERMEDIATE REPRESENTATIONS

STATEMENT REGARDING PRIOR DISCLOSURE BY THE INVENTOR OR A JOINT INVENTOR

The following disclosure is submitted under 35 U.S.C. 102(b)(1)(a): DISCLOSURE: "IBM Websphere DataPower firmware release 6.0.0" available to the public on Jun. 28, 2013.

TECHNICAL FIELD

The subject matter of this invention relates generally to software compilers. More specifically, aspects of the present invention provide a solution for improved compiling of input queries using Intermediate Representations (IRs).

BACKGROUND

Relational Algebras are commonly utilized for optimizing queries, such as database queries. Nested Relational Algebras (NRAs) are a particular type of extension which are often utilized for compiling or optimizing nested data, such as XML. Previous embodiments have translated input queries into an NRA to be compiled into a low-level code. However, optimization of the compiled result has been limited.

In one previous attempt to further optimize compilations, TXE compiled queries without the use of NRAs, such that no traditional Algebraic optimizations occurred. In another previous attempt, Zorba, an open source solution, used no NRAs and instead implemented a rudimentary set non-NRA construct matching method to attempt to recognize Joins. Saxon also utilized no NRA. Galax utilized NRAs but with no further optimizations.

SUMMARY

In general, aspects of the present invention provide a solution for compiling data. In an embodiment, an input query is provided in a first language. The input query is translated to a nested relational algebra (NRA) in the form of a first intermediate representation (IR), wherein the first IR comprises a high-level functional language including algebraic operators. A set of algorithms of the algebraic operators is implemented to compile at least some of the first IR into a second IR, wherein the second IR comprises a data-flow language. At least one of the first IR and the second IR is compiled into a low-level code.

A first aspect of the invention provides a method for compiling data, the method comprising: receiving an input query in a first language; translating the input query to a nested relational algebra (NRA) in the form of a first intermediate representation (IR), wherein the first IR comprises a high-level functional language including algebraic operators; implementing a set of algorithms of the algebraic operators to compile at least some of the first IR into a second IR, wherein the second IR comprises a data-flow language; and compiling at least one of: the first IR and the second IR, into a low-level code.

A second aspect of the invention provides a system for compiling data, comprising at least one computer device that performs a method, comprising: receiving an input query in a first language; translating the input query to a nested relational algebra (NRA) in the form of a first intermediate representation (IR), wherein the first IR comprises a high-level functional language including algebraic operators; implementing a set of algorithms of the algebraic operators to compile at least some of the first IR into a second IR, wherein the second IR comprises a data-flow language; and compiling at least one of: the first IR and the second IR, into a low-level code.

A third aspect of the invention provides a computer program product embodied in a computer readable medium for compiling data, which, when executed, performs a method comprising: receiving an input query in a first language; translating the input query to a nested relational algebra (NRA) in the form of a first intermediate representation (IR), wherein the first IR comprises a high-level functional language including algebraic operators; implementing a set of algorithms of the algebraic operators to compile at least some of the first IR into a second IR, wherein the second IR comprises a data-flow language; and compiling at least one of: the first IR and the second IR, into a low-level code.

A fourth aspect of the present invention provides a method for deploying an application for compiling data, comprising: receive a computer infrastructure being operable to: provide an input query in a first language; translate the input query to a nested relational algebra (NRA) in the form of a first intermediate representation (IR), wherein the first IR comprises a high-level functional language including algebraic operators; implement a set of algorithms of the algebraic operators to compile at least some of the first IR into a second IR, wherein the second IR comprises a data-flow language; and compile at least one of: the first IR and the second IR, into a low-level code.

Still yet, any of the components of the present invention could be deployed, managed, serviced, etc., by a service provider who offers to implement passive monitoring in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
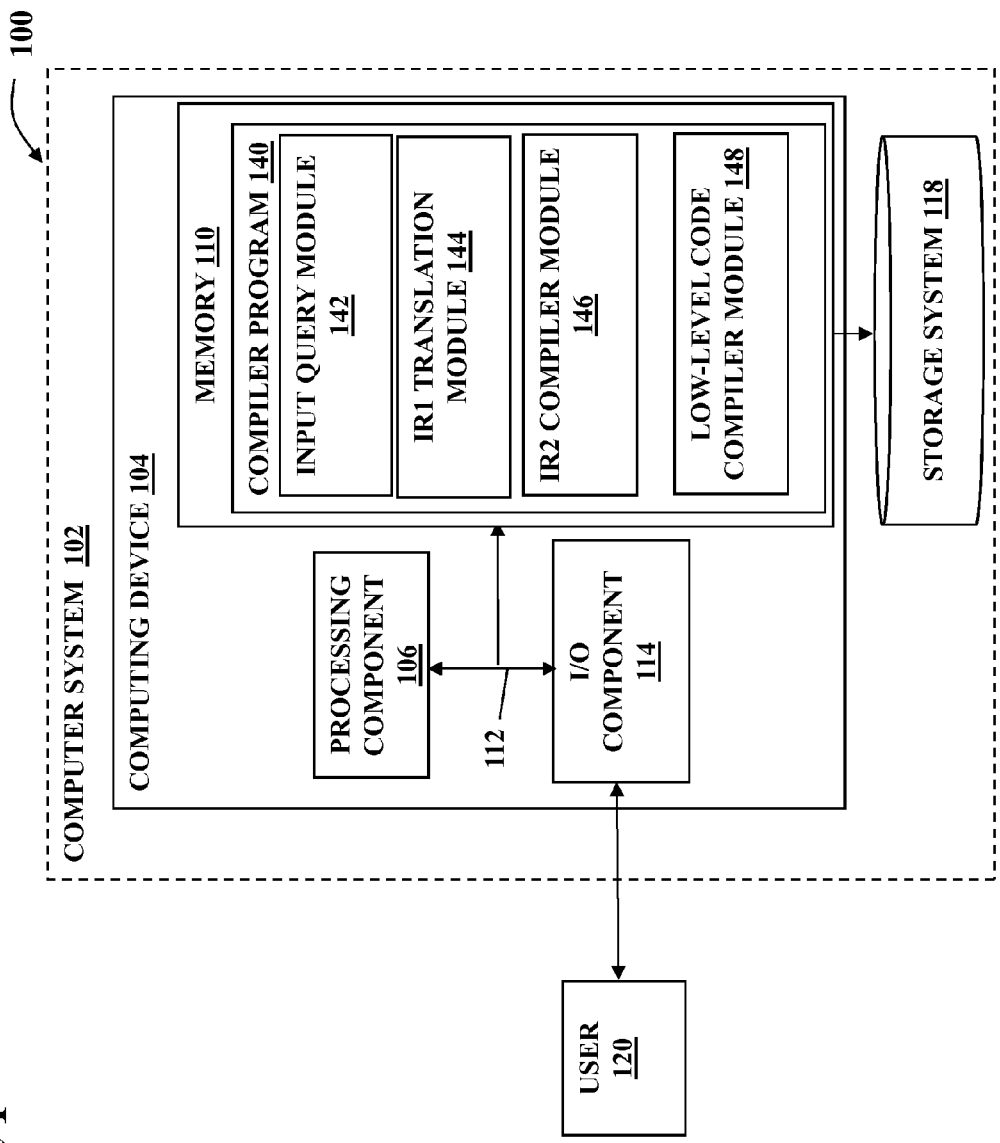
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Current methods of compiling data for optimizing database queries utilize Nested Relational Algebras (NRAs) and the input queries translated to NRAs are then optimized. However, the optimizations of NRAs are only one component of a whole language, and optimizations that target the general language alone are not practical for algebraic form optimizations. Embodiments of the current invention overcome previous optimizations of compiled queries by utilizing compiler Intermediate Representations (IRs).

As indicated above, aspects of the present invention provide a solution for compiling data. In an embodiment, an input query is provided in a first language. The input query is translated to a nested relational algebra (NRA) in the form of a first intermediate representation (IR), wherein the first IR comprises a high-level functional language including algebraic operators. A set of algorithms of the algebraic operators is implemented to compile at least some of the first IR into a second IR, wherein the second IR comprises a data-flow language. At least one of the first IR and the second IR is compiled into a low-level code.

Turning to the drawings, FIG. 1 shows an illustrative environment 100 for compiling data. To this extent, environment 100 includes a computer system 102 that can perform a process described herein in order to compile data. In particular, computer system 102 is shown including a computing device 104 that includes a compiler program 140, which makes computing device 104 operable to compile data by performing processes described herein.

Computing device 104 is shown including a processing component 106 (e.g., one or more processors), a memory 110, a storage system 118 (e.g., a storage hierarchy) in communication with computing device 104, an input/output (I/O) component 114 (e.g., one or more I/O interfaces and/or devices), and a communications pathway 112. In general, processing component 106 executes program code, such as compiler program 140, which is at least partially fixed in memory 110. To this extent, processing component 106 may comprise a single processing unit, or be distributed across one or more processing units in one or more locations.

Memory 110 also can include local memory, employed during actual execution of the program code, in communication with bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data object, etc. Moreover, similar to processing component 106, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, compiler program 140 can manage a set of interfaces (e.g., graphical user interface(s), application program interface, and/or the like) that enable human and/or system users 120 to interact with compiler program 140. Users 120 could include system administrators who want to compile data in a plurality of modes, among others. Further, compiler program 140 can manage (e.g., store, retrieve, create, manipulate, organize, present, etc.) the data in storage system 118 using any solution.

In any event, computer system 102 can comprise one or more computing devices 104 (e.g., general purpose computing articles of manufacture) capable of executing program code, such as compiler program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, compiler program 140 can be embodied as any combination of system software and/or application software. In any event, the technical effect of computer system 102 is to provide processing instructions to computing device 104 in order to compile data.

Further, compiler program 140 can be implemented using a set of modules 142-148. In this case, a module 142-148 can enable computer system 102 to perform a set of tasks used by compiler program 140, and can be separately developed and/or implemented apart from other portions of compiler program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of compiler program 140 fixed thereon (e.g., one or more modules 142-148). However, it is understood that computer system 102 and compiler program 140 are only representative of various possible equivalent computer systems that may perform a process described herein. To this extent, in other embodiments, the functionality provided by computer system 102 and compiler program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, compiler program 140 enables computer system 102 to compile data. To this extent, compiler program 140 is shown including an input query module 142, an IR1 translation module 144, an IR2 compiler module 146, and a low-level code compiler module 148.

Figure 2:
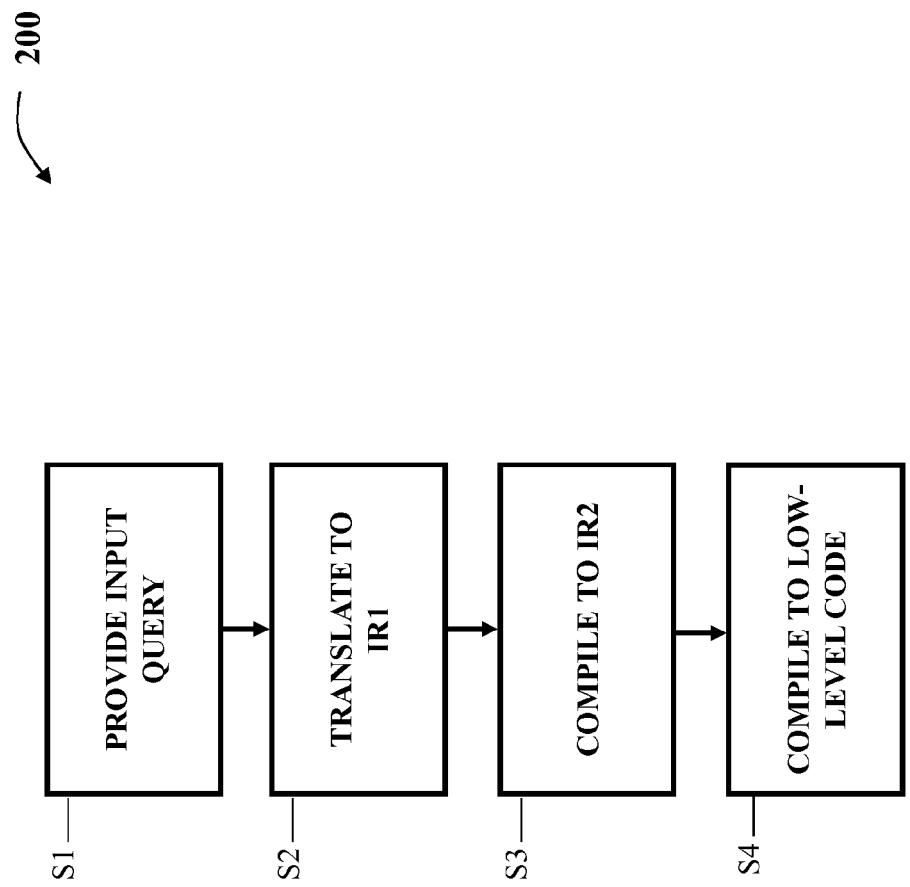
FIG. 2 shows an example flow diagram according to embodiments of the invention.

Turning now to FIG. 2, an example flow diagram according to embodiments of the invention is shown. In one embodiment, a method 200 is disclosed. As illustrated, in S1, an input query is provided in a first language, for instance using input query module 142 (FIG. 1), as executed by computer system 102 (FIG. 1). In some embodiments, the first language can include SQL, XQuery, JSONiq, XSLT, or other known or later developed languages used for input queries, including database queries. In some embodiments, generally any general functional language with query operations can be utilized for the first language. Further, it should be understood that the input query can include a 'program' that may include just a query, as in SQL, or it could refer to the whole of a program such as an XQuery query.

In S2, IR1 translation module 144 (FIG. 1), as executed by computer system 102 (FIG. 1), translates the input query to a nested relational algebra (NRA) in the form of a first Intermediate Representation (IR). In embodiments, the first IR comprises a high-level functional language with algebraic operators. This can allow for the separation of functional operations and sequence, or algebraic, operations. For instance, the first IR can be optimized by utilizing a set of functional optimizations on a set of non-algebra portions of the query. In such an instance, the first IR can be further optimized by utilizing a set of NRA optimizations on a set of algebra portions of the query. Previous attempts have grouped these separate optimizations, resulting in one or the other being efficiently optimized, but not both. In embodiments, the translation to the first IR is run long enough to separately optimize these two components before moving on to the next step.

In S3, IR2 compiler module 146 (FIG. 1), as executed by computer system 102 (FIG. 1), implements a set of algorithms of the algebraic operators to compile at least some of the first IR into a second IR. In embodiments, the second IR comprises a data-flow language. At least a portion of the first IR is compiled into the second IR. For example, the second IR can be optimized by utilizing a set of data-flow optimizations. In some embodiments, the second IR can be further optimized by utilizing a set of specific optimizations that target the part of the second IR that was compiled from a set of the algebraic operators of the first IR. That is, the second IR can be separately optimized in order to create data-flow optimizations and specific optimizations based on the algebraic portions optimized in the first IR. The second IR can be considered a hybrid language, utilizing functional data-flow language in conjunction with lower-level extensions for compiling NRA operators, and is unique to embodiments of the present invention. The second IR can include hash tables for efficiently implementing joins. In some embodiments, all of the first IR is compiled into the second IR.

By separating the first IR and the second IR, as well as utilizing separate optimizations for algebraic and non-algebraic portions, significant advantages have become evident. In practice, many optimizations or implementations of functions fit more naturally in either the first IR or the second IR. Due to this advantage combined with the separate algebraic and non-algebraic optimizations described above, the compiling can be easier to implement than previous attempts that did not allow for multiple IRs in certain embodiments of the invention, much less separate optimization of both the first IR and the second IR. For instance, NRAs inside of general functional programming languages can be better optimized by allowing for multiple IRs, or multiple optimizations within multiple IRs, and combinations thereof.

In previous attempts to optimize queries, for instance queries in DB2 or Oracle, queries could be very slow and time consuming, as well as requiring higher amounts of memory and reducing runtime performance. For instance, a query for all employees whose names begin with A-L and that were in a particular region would result in a search of every single employee to find the names, and every single employee in a particular region. By optimizing and compiling according to embodiments of the current invention, the search could be limited by searching both of these at the same time without a separate search of each employee for each parameter. As such, advantages of embodiments include better runtime performance, less memory use, and thus a better compilation time and quicker time-to-market for such compilations. These advantages exceed those in the prior art due to the combination of multiple IRs and the advantages of utilizing algebraic and non-algebraic specific optimizations in both the first IR and the second IR.

In S4, low-level code compiler module 148 (FIG. 1), as executed by computer system 102 (FIG. 1), compiles at least one of the first IR and the second IR into a low-level code. As described above, if all of the first IR is compiled to the second IR, only the second IR needs to be compiled into low-level code. However, if only a portion of the first IR is compiled into the second IR, some of the first IR and some of the second IR may be compiled into a low-level code. In any case, it should be understood that low-level code can include, but is not limited to, assembly code, virtual machine (VM) code, and virtual machine code instructions. In some embodiments, the low-level code can include x86 instructions (assembly code), Java bytecodes (VM code), other specific higher-level VM code instructions for any known or later developed VMs, and POWER instructions.

While shown and described herein as a method and system for compiling data using multiple IRs, it is understood that aspects of the invention further provide various alternative embodiments. For example, in one embodiment, the invention provides a computer program fixed in at least one computer-readable medium, which when executed, enables a computer system to compile data. To this extent, the computer-readable medium includes program code, such as compiler program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as compiler program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method for deploying an application for compiling data. In this case, a computer system, such as computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for compiling data, the method comprising:
receiving an input query in a first language;
translating the input query to a nested relational algebra (NRA) in the form of a first intermediate representation (IR), wherein the first IR comprises a high-level functional language including algebraic operators;
implementing a set of algorithms of the algebraic operators to compile at least some of the first IR into a second IR, wherein the second IR comprises a hybrid language which utilizes a data-flow language and a set of lower-level extensions, and wherein the second IR is optimized by utilizing a set of specific optimizations targeting a part of the second IR that was compiled from a set of algebraic operators of the first IR, wherein the first IR is optimized by utilizing a set of functional optimizations on a set of non-algebra portions of the first IR, wherein the second IR is further optimized by utilizing a set of data-flow optimizations; and
compiling at least one of: the first IR and the second IR, into a low-level code.

2. The method of claim 1, wherein all of the first IR is compiled into the second IR.

3. The method of claim 2, wherein only the second IR is compiled into the low-level code.

4. The method of claim 1, wherein the first IR is further optimized by utilizing a set of NRA optimizations on a set of algebra portions of the first IR.

5. The method of claim 1, wherein the low-level code is selected from a group comprising: assembly code, virtual machine code, and virtual machine code instructions.

6. A system for compiling data, comprising at least one computer device that performs a method, comprising:
receiving an input query in a first language;
translating the input query to a nested relational algebra (NRA) in the form of a first intermediate representation (IR), wherein the first IR comprises a high-level functional language including algebraic operators;
implementing a set of algorithms of the algebraic operators to compile at least some of the first IR into a second IR, wherein the second IR comprises a hybrid language which utilizes a data-flow language and a set of lower-level extensions, and wherein the second IR is optimized by utilizing a set of specific optimizations targeting a part of the second IR that was compiled from a set of algebraic operators of the first IR, wherein the first IR is optimized by utilizing a set of functional optimizations on a set of non-algebra portions of the first IR, wherein the second IR is further optimized by utilizing a set of data-flow optimizations; and
compiling at least one of: the first IR and the second IR, into a low-level code.

7. The system of claim 6, the method further comprising:
wherein all of the first IR is compiled into the second IR.

8. The system of claim 7, the method further comprising:
wherein only the second IR is compiled into the low-level code.

9. The system of claim 6, the method further comprising:
wherein the first IR is further optimized by utilizing a set of NRA optimizations on a set of algebra portions of the first IR.

10. The system of claim 6, the method further comprising:
wherein the low-level code is selected from a group comprising: assembly code, virtual machine code, and virtual machine code instructions.

11. A computer program product embodied in a non-transitory computer readable medium for compiling data, which, when executed, performs a method comprising:
receiving an input query in a first language;
translating the input query to a nested relational algebra (NRA) in the form of a first intermediate representation (IR), wherein the first IR comprises a high-level functional language including algebraic operators;
implementing a set of algorithms of the algebraic operators to compile at least some of the first IR into a second IR, wherein the second IR comprises a hybrid language which utilizes a data-flow language and a set of lower-level extensions, and wherein the second IR is optimized by utilizing a set of specific optimizations targeting a part of the second IR that was compiled from a set of algebraic operators of the first IR, wherein the first IR is optimized by utilizing a set of functional optimizations on a set of non-algebra portions of the first IR, wherein the second IR is further optimized by utilizing a set of data-flow optimizations; and
compiling at least one of: the first IR and the second IR, into a low-level code.

12. The computer program product of claim 11, the method further comprising:
wherein all of the first IR is compiled into the second IR.

13. The computer program product of claim 12, the method further comprising:
wherein only the second IR is compiled into the low-level code.

14. The computer program product of claim 11, the method further comprising:
wherein the first IR is further optimized by utilizing a set of NRA optimizations on a set of algebra portions of the first IR.

15. The computer program product of claim 11, the method further comprising:

wherein the low-level code is selected from a group comprising: assembly code, virtual machine code, and virtual machine code instructions.

16. A method for deploying an application for compiling data, comprising:
provide a computer infrastructure being operable to:
receive an input query in a first language;
translate the input query to a nested relational algebra (NRA) in the form of a first intermediate representation (IR), wherein the first IR comprises a high-level functional language including algebraic operators;
implement a set of algorithms of the algebraic operators to compile at least some of the first IR into a second IR, wherein the second IR comprises a hybrid language which utilizes a data-flow language and a set of lower-level extensions, and wherein the second IR is optimized by utilizing a set of specific optimizations targeting a part of the second IR that was compiled from a set of algebraic operators of the first IR, wherein the first IR is optimized by utilizing a set of functional optimizations on a set of non-algebra portions of the first IR, wherein the second IR is further optimized by utilizing a set of data-flow optimizations; and
compile at least one of: the first IR and the second IR, into a low-level code.

* * * * *